(12) United States Patent
Hamer

(10) Patent No.: US 8,316,402 B2
(45) Date of Patent: Nov. 20, 2012

(54) SYSTEM FOR SELECTING A VIDEO OR AUDIO PATH

(75) Inventor: Louis-Nicolas Hamer, Verdun (CA)

(73) Assignee: Verint Systems Inc., Santa Clara, CA (US)

( * ) Notice: Subject to any disclaimer, the term of this patent is extended or adjusted under 35 U.S.C. 154(b) by 676 days.

(21) Appl. No.: 12/015,375

(22) Filed: Jan. 16, 2008

(65) Prior Publication Data

US 2009/0183224 A1     Jul. 16, 2009

(51) Int. Cl.
*H04N 7/18* (2006.01)
*H04N 7/173* (2011.01)
*H04N 7/16* (2011.01)
*H04N 7/14* (2006.01)

(52) U.S. Cl. ............ 725/81; 725/80; 725/133; 725/141; 725/153; 348/14.01

(58) Field of Classification Search .................... 725/50, 725/81, 141, 148, 80, 133, 135, 153; 348/14.01
See application file for complete search history.

(56) References Cited

U.S. PATENT DOCUMENTS

| | | | |
|---|---|---|---|
| 5,177,480 A * | 1/1993 | Clark .............................. 341/51 |
| 5,510,828 A | 4/1996 | Lutterbach | |
| 6,058,192 A | 5/2000 | Guralnick et al. | |
| 6,144,702 A * | 11/2000 | Yurt et al. ................. 375/240.01 |
| 2001/0008546 A1 | 7/2001 | Fukui et al. | |
| 2003/0068992 A1* | 4/2003 | Kim et al. ................... 455/188.1 |
| 2003/0121043 A1 | 6/2003 | Reinold et al. | |
| 2004/0030929 A1* | 2/2004 | Bi et al. ........................ 713/201 |
| 2005/0028211 A1* | 2/2005 | Mochizuki et al. ............. 725/80 |
| 2005/0069288 A1* | 3/2005 | Miller et al. .................... 386/46 |
| 2007/0297427 A1* | 12/2007 | Cho .............................. 370/401 |

FOREIGN PATENT DOCUMENTS

EP     0952732 A2     10/1999

OTHER PUBLICATIONS

Notice of Allowance for Canadian Application No. 2,627,318, dated Jul. 22, 2010.
Extended European Search report issued by the European Patent Office on Jan. 7, 2011 in European Patent Application No. 08251569. 3, 6 pages.

* cited by examiner

*Primary Examiner* — Pankaj Kumar
*Assistant Examiner* — Alazar Tilahun

(57) ABSTRACT

A communication system where an input port on a transmitter or receiver is configured to receive input data that is either audio data or video data. A processor in the transmitter or the receiver is configured to detect if the input data is either audio data or video data. The processor selects an audio path if the input data is audio data. If the input data is video data, the processor selects a video path. The selected audio path or video path sends audio output data or video output data to an output port. The output port is configured to send the audio output data or video output data.

22 Claims, 8 Drawing Sheets

SYSTEM FOR SELECTING A VIDEO OR AUDIO PATH

TECHNICAL FIELD

The invention is related to the field of communications, and in particular, to systems and methods of selecting video and audio communications.

TECHNICAL BACKGROUND

Audio and video communication systems allow the transfer of audio and video communications for applications such as surveillance, remote monitoring, video streaming, audio streaming, and the like. Typically, a transmitter will receive audio or video communications from an audio or video source and transmit the audio or video data to a receiver at a remote location. Currently, most of these communication systems come preconfigured to support only audio or video inputs on any given port. Once a communication system is purchased, the communication system often cannot be reconfigured to support different types of communications without substantial modification. For example, if a communication system needs to support audio data, and the current system only supports video data, a user will need to purchase additional equipment to support the audio data. This lack of flexibility in current communication systems results in higher system and maintenance costs.

TECHNICAL SUMMARY

A communication system and its method of operation are disclosed where a processor connected to an input port is configured to determine if input data is either audio or video data. Based on the input data, the processor selects an audio path if the input data is audio data or a video path if the input data is video data. Audio output data and video output data from the audio path or video path is sent to an output port.

In an embodiment, a transmitter is configured to receive either audio data or video data. A processor in the transmitter is configured to determine if the data at the input port is either audio data or video data. The transmitter includes both an audio path, and a video path. The appropriate path is selected based on the format of the input data, or on an indication of the expected format of the input data. The selected audio path or video path sends audio output data or video output data to an output port. The output port is configured to send the audio output data or video output data to a receiver.

In another embodiment, the receiver receives the output data from the transmitter at an input port. A processor in the receiver is configured to determine if the data at the input port is either audio data or video data. An appropriate audio path or video path for the input data is selected based on the format of the input data, or on an indication of the expected format of the input data. The selected audio path or video path sends audio output data or video output data to an output port. The output port is configured to provide the audio output data or video output data to an audio or video device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
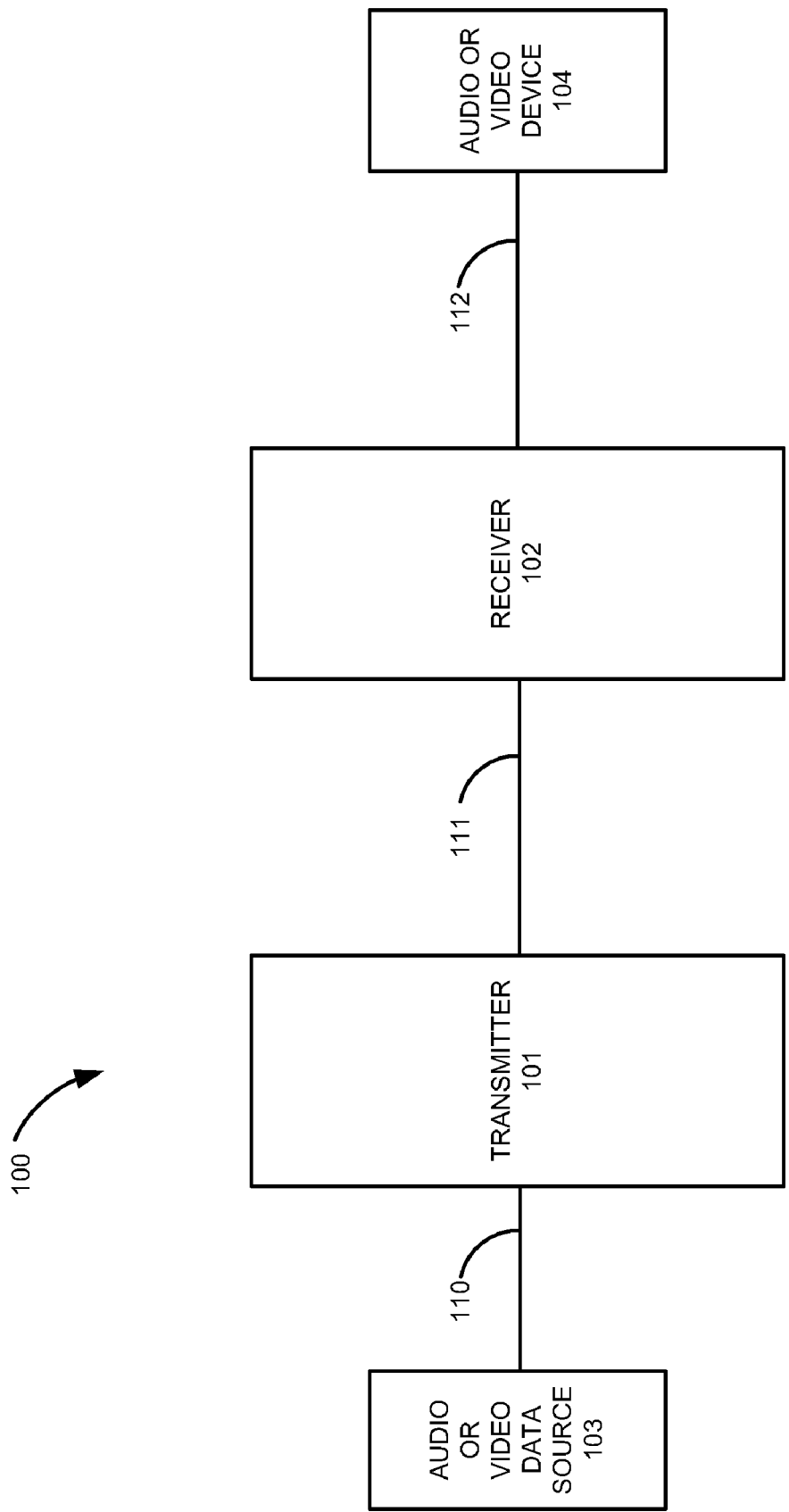
FIG. 1 is a block diagram that illustrates a communication system.

FIG. 1 is a block diagram that illustrates communication system 100. Communication system 100 is typically used to provide a communication link for video or audio communications from audio or video source 103 to audio or video device 104. For example, a monitor connected to receiver 102 may be used to display a video signal from a video camera connected to transmitter 101.

Communication system 100 comprises transmitter 101 and receiver 102. An audio or video data source 103 provides input data to transmitter 101 via link 110. Transmitter 101 determines whether the input data is audio data or video data. This determination may be made using a wide variety of methods, such as parsing the input data, checking the status of a control, switch, pin, or other indicator, all within the scope of the present invention. Transmitter 101 is also configured to send audio output data or video output data to receiver 102 via link 111. Receiver 102 determines if the output data from transmitter 101 is audio data or video data. Similar to transmitter 101, receiver 102 may make this determination using any of a wide variety of methods known to those of skill in the art, within the scope of the present invention. Receiver 102 is also configured to provide audio output data or video output data to audio or video device 104 via link 112.

Audio or video data source 103 may be any device that can generate or send audio data or video data such as a video camera, a DVD player, a video server, a microphone, an MP3 player, an audio server, and the like. Transmitter 101 and receiver 102 comprise processing and communication circuitry, and are shown in more detail in FIGS. 2 and 3, and discussed below. Audio or video device 104 may be any device that can receive audio data or video data such as a television, a personal computer, a video recorder, an MP3 player, a sound system, and the like. Links 110-112 comprise wireless or wireline communication connections. Links 110-112 may be direct links or they may include various intermediate systems and components.

In addition to audio and video data, the communication system 100 may also pass data such as key codes, security identification information, and the like. Some of this data may be configured as audio or video data. For example, key codes may use DTMF (Dual-Tone Multi-Frequency) encoding and be included in the audio stream. Other embodiments may include one or more sets of dry contacts used to connect to a gate or other physical structure allowing a user to remotely control the gate or other physical structure. Still other embodiments may include a communication port configured to allow control of a video device. For example, the communication port may be a serial port configured to control the pan-tilt-zoom of a video camera within the system. Other systems may use other methods of transferring this data in addition to the audio or video data streams described above.

Figure 2:
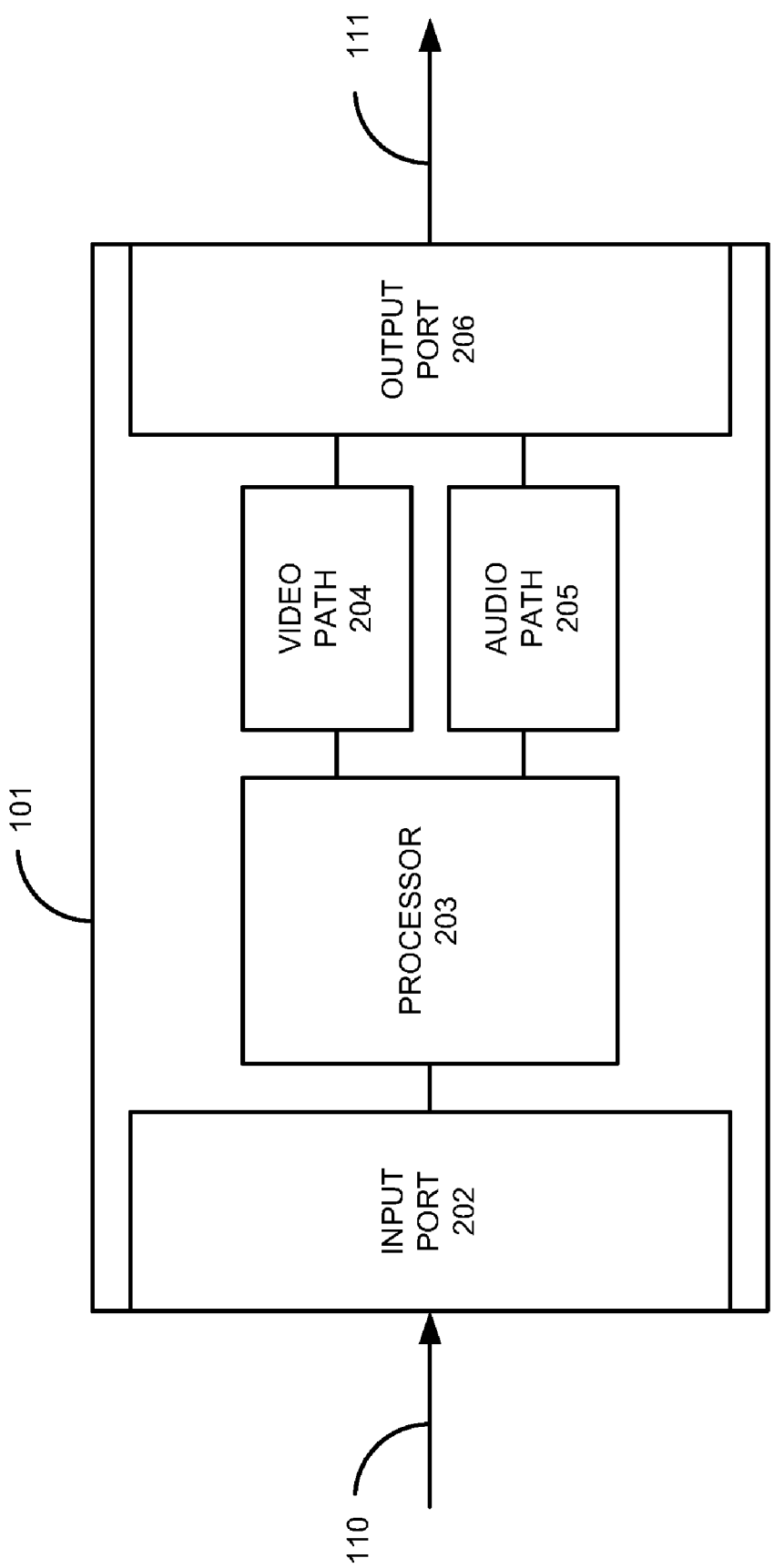
FIG. 2 is a block diagram that illustrates a transmitter of a communication system.

FIG. 2 is a block diagram that illustrates transmitter 101 of communication system 100. Transmitter 101 comprises input port 202, processor 203, video path 204, audio path 205, and output port 206. Input port 202 is coupled with processor 203. Processor 203 in turn is coupled with audio path 205 and video path 204. Audio path 205 and video path 204 are coupled with output port 206.

Input port 202 receives input data comprising audio data or video data via link 110 from audio or video data source 103. Processor 203 then receives the input data from input port 202. Processor 203 determines if the input data from input port 202 comprises audio data or video data, using any of a variety of methods known to those of skill in the art, within the scope of the present invention. These methods may include parsing the input data, checking the status of a control, switch, pin, or other indicator, all within the scope of the present invention. Processor 203 is configured to send the input data to audio path 205 when the input data has been determined to comprise audio data. Likewise, processor 203 sends the input data to video path 204 when the input data has been determined to comprise video data. Output port 206 receives audio output data from audio path 205 or video output data from video path 204. Output port 206 then transmits the audio output data or the video output data to receiver 102 via link 111.

The input data comprises either audio data or video data, which may be analog, digital, or a combination of both analog and digital signals. Audio data or video data may include signals or protocols such as MPEG, MP3, analog video, analog audio, and the like. Input port 202 and output port 206 comprise circuitry or connections capable of handling both audio and video communications. Processor 203 comprises processing circuitry. Processor 203 may also comprise memory and computer instructions.

Audio path 205 comprises circuitry or connections capable of handling audio communications. For example, audio path 205 may be a wire, a digital audio circuit, or an analog audio circuit. Audio input data processed by audio path 205 may be modified by audio path 205. For example, audio path 205 may perform speech enhancement, provide noise reduction, convert an analog audio signal to a digital audio signal, or convert a digital audio signal to an analog video signal.

Video path 204 comprises circuitry or connections capable of handling video communications. For example, video path 204 may be a wire, a digital video circuit, or an analog video circuit. Video input data received on video path 204 may be modified by video path 204. For example, video path 204 may perform video enhancement, provide video compression, convert an analog video signal to a digital video signal, or convert a digital video signal to an analog video signal.

Figure 3:
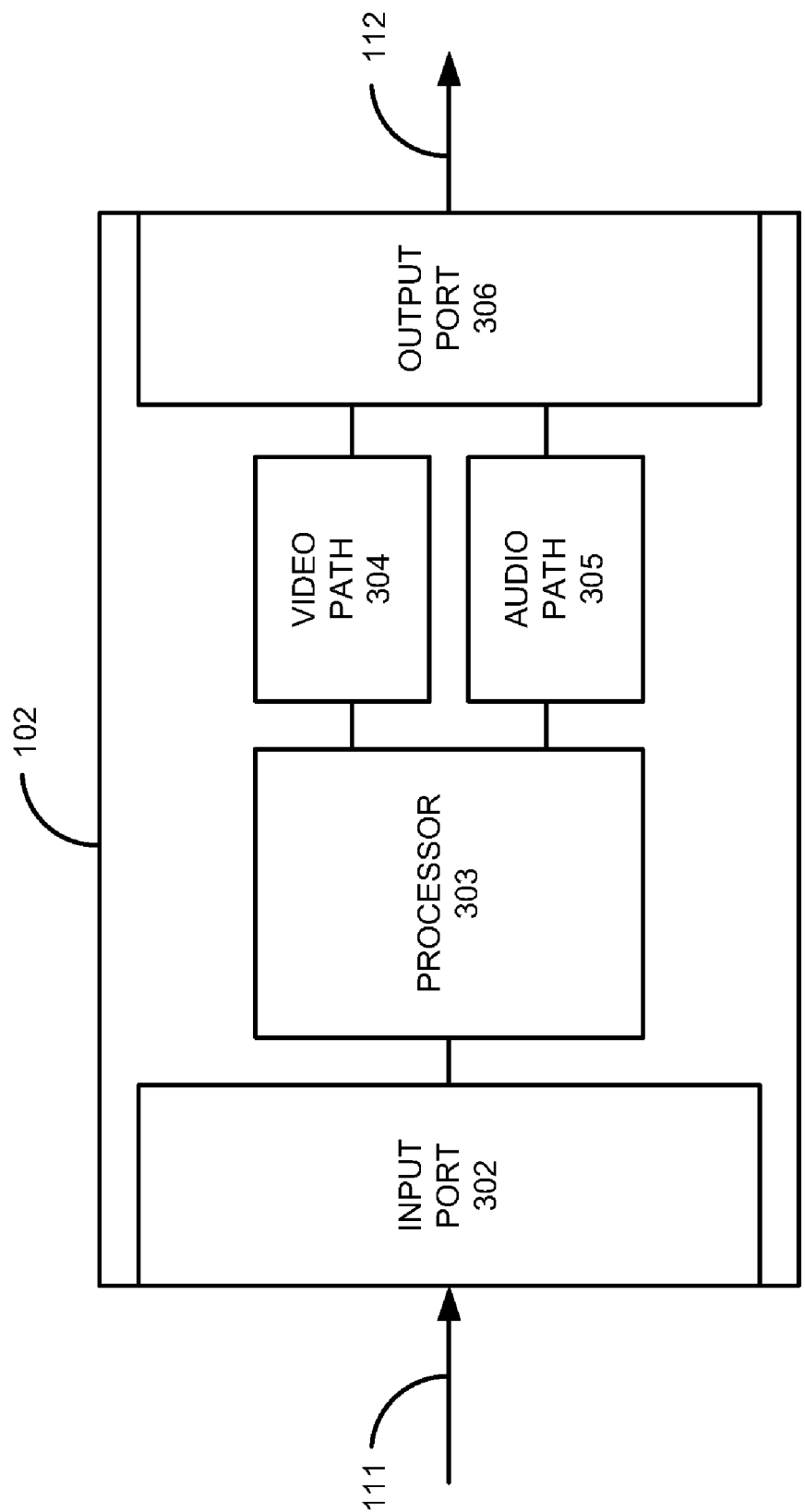
FIG. 3 is a block diagram that illustrates a receiver of a communication system.

FIG. 3 is a block diagram that illustrates receiver 102 of communication system 100. Receiver 102 comprises input port 302, processor 303, video path 304, audio path 305, and output port 306. Input port 302 is coupled with processor 303. Processor 303 is coupled with audio path 305 and video path 304, and audio path 305 and video path 304 are coupled with output port 306.

Input port 302 is configured to receive input data comprising audio data or video data via link 111 from transmitter 101. Processor 303 receives the input data from input port 302. Processor 303 is configured to determine if the input data from input port 302 comprises audio data or video data. Processor 303 sends the input data to audio path 305 when the input data is determined to comprise audio data. Likewise, processor 303 sends the input data to video path 304 when the input data is determined to comprise video data. Output port 306 receives audio output data from audio path 305 or video output data from video path 304. Output port 306 then provides the audio output data or the video output data to audio or video device 104 via link 112.

Figure 4:
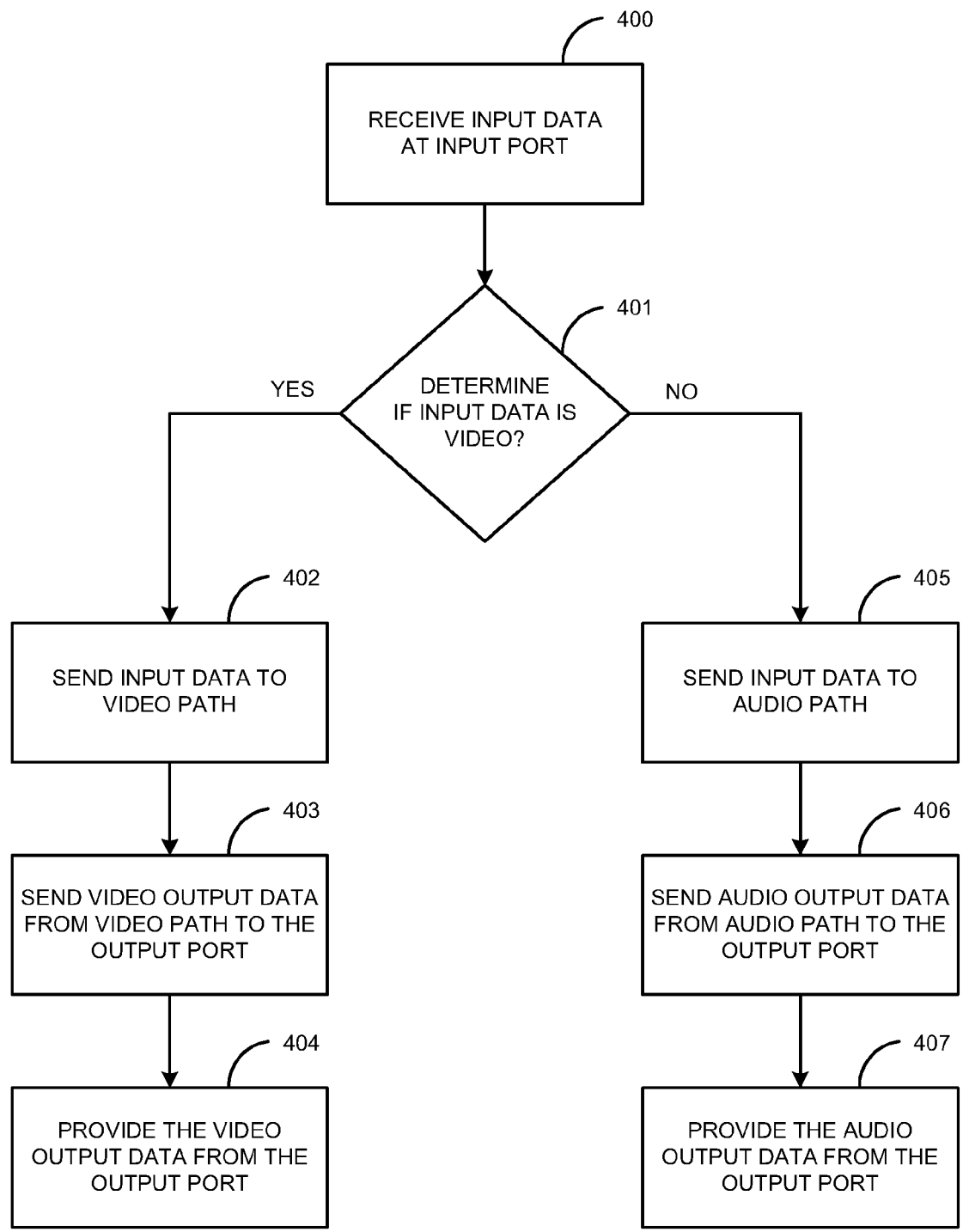
FIG. 4 is a flow diagram that illustrates a method of operating a communication system.

FIG. 4 is a flow diagram that illustrates a method of operating communication system 100. In operation 400, input data is received at an input port. In operation 401, a processor determines if the input data is either audio data or video data. The processor can determine if the input data is audio data or video data in a variety of ways within the scope of the present invention. For example, if the input data is an analog signal, the processor may examine the analog signal by sampling the frequency of the analog signal to determine if the analog signal is an audio signal or a video signal. A higher frequency signal may indicate a video signal, whereas a lower frequency signal may indicate an audio signal. Alternatively, if the input data is digital data, the processor may determine whether the data is audio data or video data based on examining a packet header or examining data within a packet.

If the processor determines that the input data is audio data, the processor sends the input data to an audio path in operation 405. The audio path processes the audio data and then sends audio output data to an output port in operation 406. In operation 407, the output port transmits the audio output data from an output port.

If the processor determines that the input data is video data, the processor sends the input data to a video path in operation 402. The video path processes the video data and then sends video output data to an output port in operation 403. In operation 404, the output port transmits the video output data from output port. The example method of FIG. 4 is used by either a transmitter or receiver.

Figure 5:
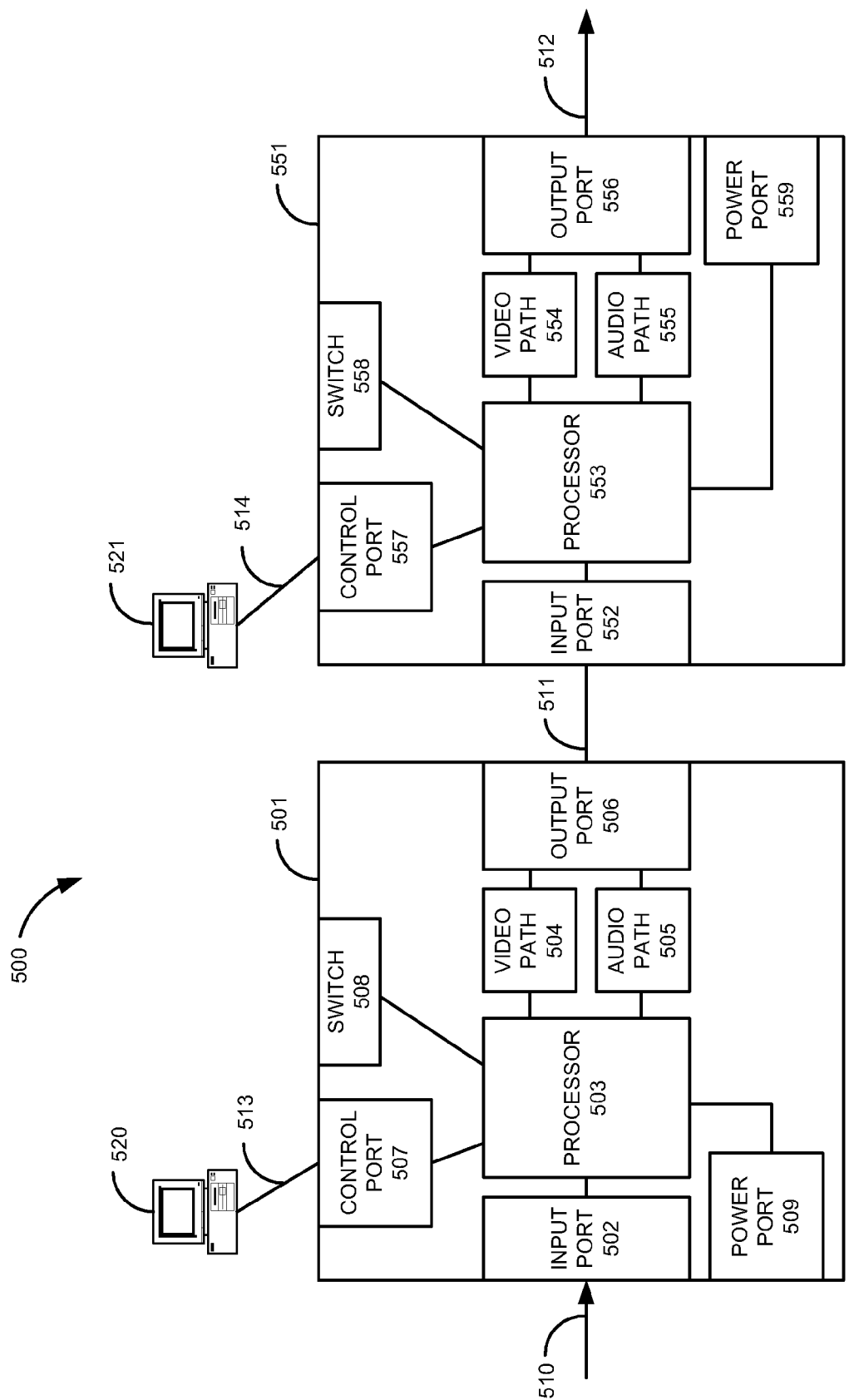
FIG. 5 is a block diagram that illustrates a communication system.

FIG. 5 is a block diagram that illustrates communication system 500. This communication system includes transmitter 501, similar to that illustrated in FIG. 2, in communication with receiver 551, similar to that illustrated in FIG. 3. Transmitter 501 comprises input port 502, processor 503, video path 504, audio path 505, output port 506, control port 507, switch 508, and power port 509. Input port 502, control port 507, switch 508, power port 509, video path 504, and audio path 505 are coupled with processor 503. Audio path 505 and video path 504 are coupled with output port 506. Control device 520 communicates with control port 507 via link 513. Those of skill in the art will recognize that other transmitters may have other architectures and include other devices or methods for control within the scope of the present invention.

Receiver 551 comprises input port 552, processor 553, video path 554, audio path 555, output port 556, control port 557, switch 558, and power port 559. Input port 552, control port 557, switch 558, power port 559, audio path 555, and video path 554 are coupled with processor 553. Audio path 555 and video path 554 are coupled with output port 556. Control device 521 communicates with control port 557 via link 514. Those of skill in the art will recognize that other receivers may have other architectures and include other devices or methods for control within the scope of the present invention.

Control devices 520-521 may be any type of device that can send control signals such as a personal computer, a telephone, a personal digital assistant, and the like. Switches 508 and 558 may be any type of switch, such as a toggle switch, a push button switch, an electronic switch, a sensor, and the like. Control ports 507 and 557 may be any type of communication interface such as Ethernet, RS-232, WiFi, and the like. Power ports 509 and 559 could be any type of port that supplies power to an attached device. Links 510-514 comprise wireless or wireline communication connections. Links 510-514 may be direct links or they may include various intermediate systems and components.

Input port 502 receives input data comprising audio data or video data from an audio or video data source (not shown) via link 510. Processor 503 receives the input data from input port 502. Processor 503 determines if the input data from input port 502 comprises audio data or video data. Processor 503 sends the input data to audio path 505 when the input data has been determined to comprise audio data. Processor 503 sends the input data to video path 504 when the input data has been determined to comprise video data. Optionally, processor 503 may perform video analytics on the input data. Output port 506 receives audio output data from audio path 505 or video output data from video path 504. Output port 506 sends the audio output data or the video output data to receiver 551 via link 511.

Input port 552 receives input data comprising audio data or video data from transmitter 501 via link 511. Processor 553 receives the input data from input port 552. Processor 553 determines if the input data from input port 552 comprises audio data or video data. Processor 553 sends the input data to audio path 555 when the input data has been determined to comprise audio data. Processor 553 sends the input data to video path 554 when the input data has been determined to comprise video data. Output port 556 receives audio output data from audio path 555 or video output data from video path 554. Output port 556 presents the audio output data or the video output data to an audio or video device (not shown) via link 512.

In order to determine the expected format of the input data, processor 503 monitors switch 508 or a pin on input port 502 for the current state or to detect a change in the status of switch 508 or the pin on input port 502. Upon detecting a change of state in switch 508 or the pin on input port 502, processor 503 determines if the change of state indicates an expected format of audio data or video data. For example, processor 503 monitors a terminal in switch 508 or the pin on input port 502. A high on the switch terminal or the pin on input port 502 may indicate an expected format of audio data and a low may indicate an expected format of video data. If the switch terminal or pin on input port 502 transitions from a high to a low (or is currently low), processor 503 sends the input data from input port 502 to video path 504. If the switch terminal or pin on input port 502 transitions from a low to a high (or is currently high), processor 503 sends the input data from input port 502 to audio path 505. Upon detecting a change of state, or based on the current state, processor 503 could also send a signal to processor 553 indicating that processor 553 is to send input data from input port 552 in the same manor as processor 503.

Likewise, in order to determine the expected format of the input data, processor 553 monitors switch 558 or a pin on input port 552 for the current state or to detect a change in the status of switch 558 or a pin on input port 552. Upon detecting a change of state in switch 558 or the pin on input port 552, processor 553 determines if the change of state indicates an expected format of audio data or video data. If the change of state or current state indicates an audio format, processor 553 sends the input data from input port 552 to audio path 555. If the change of state or current state indicates a video format, processor 553 sends the input data from input port 552 to video path 554. Upon detecting a change of state, or based on the current state, processor 553 could send a signal to processor 503 indicating that processor 503 is to send input data from input port 502 in the same manor as processor 553.

Control device 520 is used to configure transmitter 501 to send input data received at input port 502 to either audio path 505 or video path 504 based on an expected format of the input data. Control device 520 sends a signal via link 513 to control port 507. Processor 503 receives the signal from control port 507. If the signal indicates an expected audio format, processor 503 sends the input data from input port 502 to audio path 505. If the signal indicates an expected video format, processor 503 sends the input data from input port 502 to video path 504. Upon receiving the signal from control device 520 indicating an expected audio format, processor 503 may also send a signal to processor 553 indicating that processor 553 is to send input data from input port 552 to audio path 555. Moreover, if a signal from control device 520 indicates an expected video format, processor 503 may send a signal to processor 553 indicating that processor 553 is to send input data from input port 552 to video path 554.

Likewise, control device 521 is used to configure receiver 551 to send input data received at input port 552 to either audio path 555 or video path 554 based on an expected format of the input data. Control device 521 sends a signal via link 514 to control port 557. Processor 553 receives the signal from control port 557. If the signal indicates an expected audio format, processor 553 sends the input data from input port 552 to audio path 555. If the signal indicates an expected video format, processor 553 sends the input data from input port 552 to video path 554. Upon receiving the signal from control device 521 indicating an expected audio format, processor 553 may also send a signal to processor 503 indicating that processor 503 is to send input data from input port 502 to audio path 505. Moreover, if a signal from control device 521 indicates an expected video format, processor 553 may send a signal to processor 503 indicating that processor 503 is to send input data from input port 502 to video path 504.

When processor 503 determines if the input data is audio data or video data, processor 503 may also select an amount of power supplied to power port 509. This determination may be made using a wide variety of methods, such as parsing the input data, checking the status of a control, switch, pin, or other indicator. For example, if processor 503 determines that the input data is audio data, power port 509 may supply 12 volts to power an audio device connected to input port 502. Alternatively, if processor 503 determines that the input data is video data, power port 509 may supply 24 volts to power a video device connected to input port 502. Receiver 551 uses a similar process to supply power from power port 559 to devices connected to output port 556.

Figure 6:
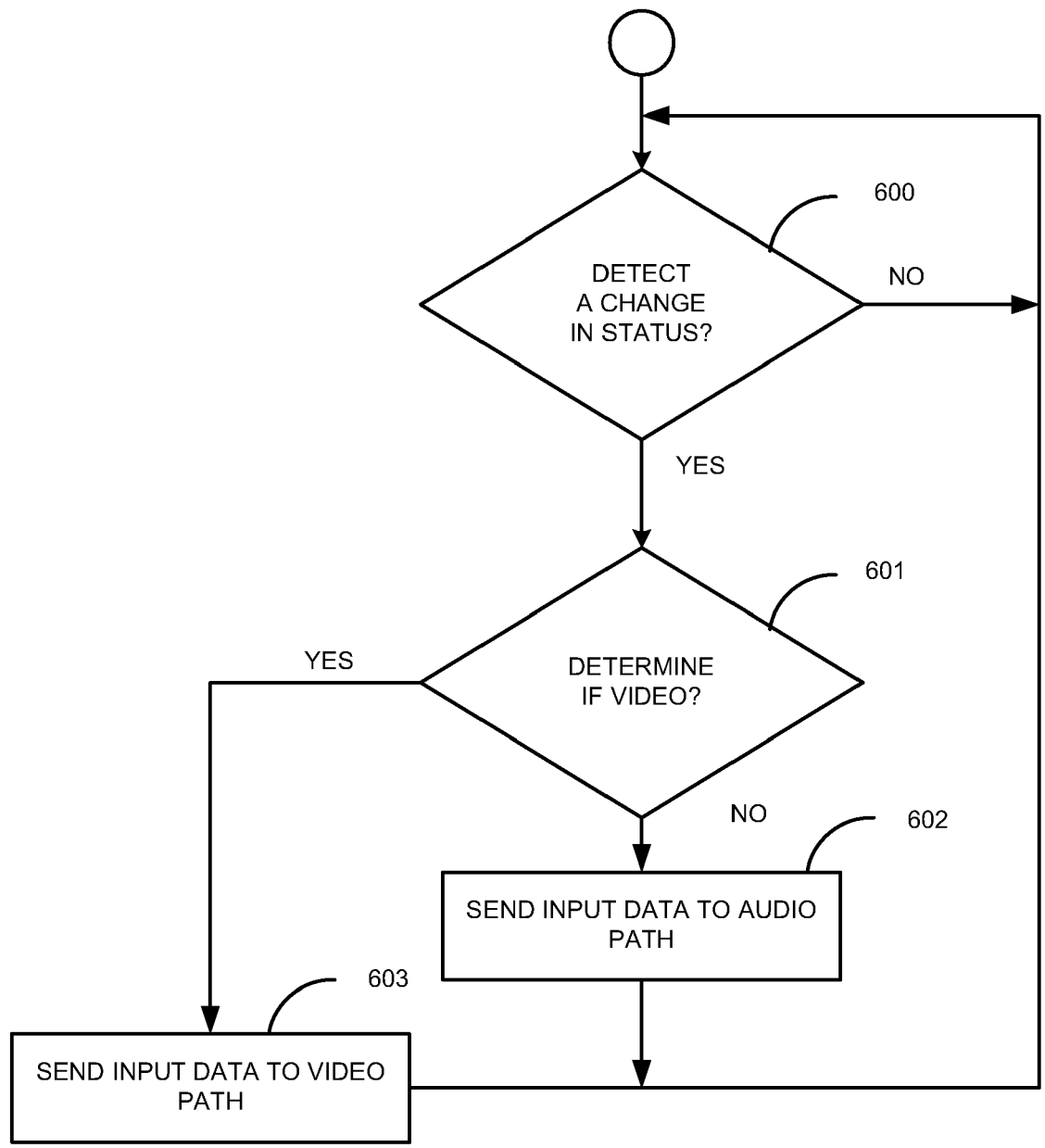
FIG. 6 is a flow diagram that illustrates a method of selecting a data path for audio data or video data.

FIG. 6 is flow diagram that illustrates a method of selecting a data path for audio data or video data. In operation 600, a processor detects a status change in a switch or a pin on an input port. If the status of the switch or the pin on the input port has not changed, operation 600 is repeated. If the status of the switch or the pin on the input port has changed, the processor in operation 601 determines if the status change indicates an expected format of audio data or video data. If the status change indicates an expected video format, the processor in operation 603 sends input data from the input port to a video path. If the status change indicates an expected audio format, the processor in operation 602 sends input data from the input port to an audio path. This method may be used by either a transmitter or a receiver.

Figure 7:
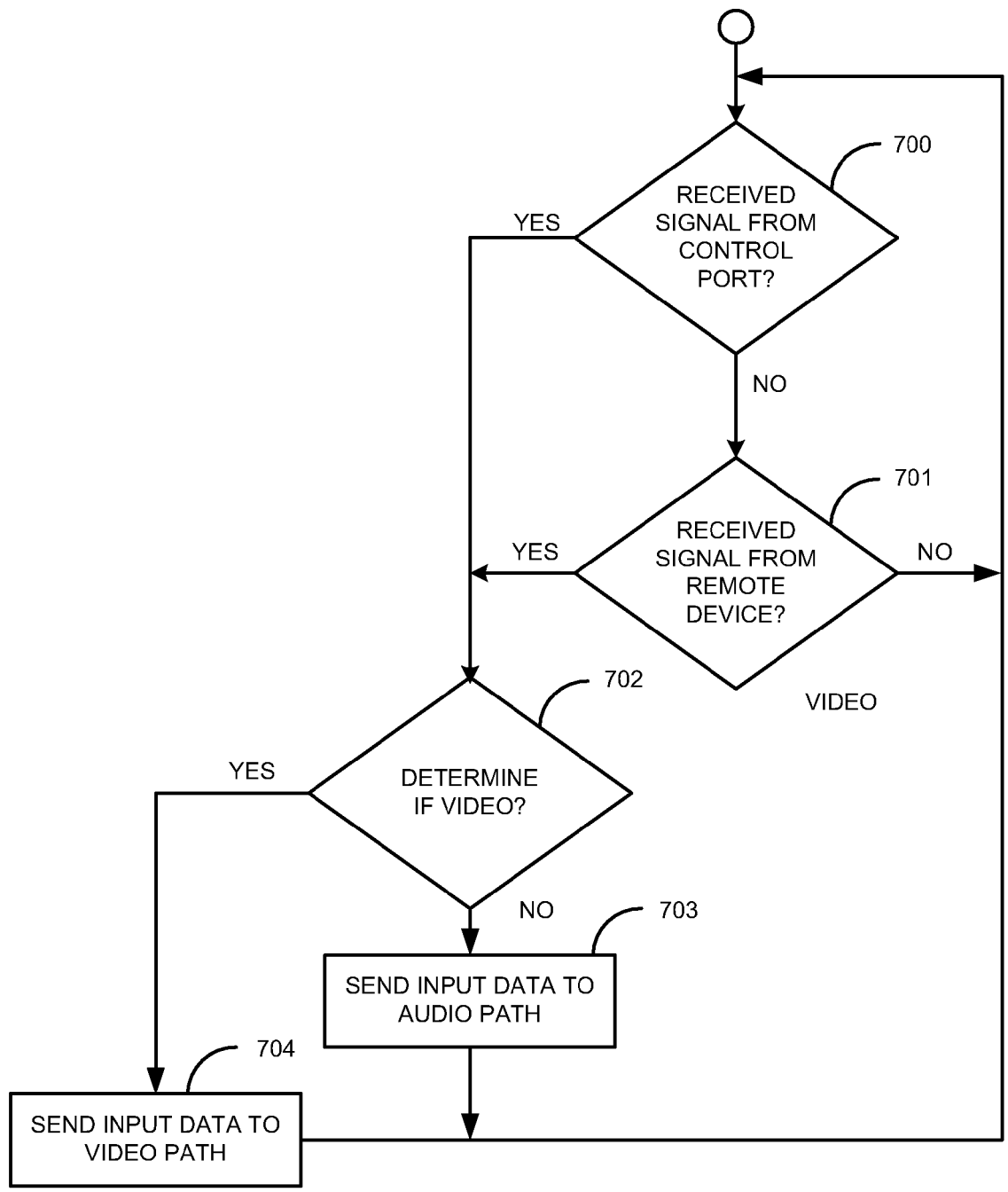
FIG. 7 is a flow diagram that illustrates a method of selecting a data path for audio data or video data.

FIG. 7 is a flow diagram that illustrates a method of selecting a data path for audio data or video data. In operation 700, if the processor has received a control signal from a control port or if the processor in operation 701 has received a control signal from a remote device (such as a transmitter or a receiver), the processor in operation 702 determines if the control signal indicates an expected format of audio data or video data. Otherwise, operation 700 repeats. If the processor in operation 702 determines that the control signal indicates an expected video format, the processor in operation 702 sends the input data from the input port to a video path in operation 704. If the processor determines that the control signal indicates an expected audio format, the processor in operation 703 sends the input data from the input port to an audio path. This method may be used by either a transmitter or a receiver.

Figure 8:
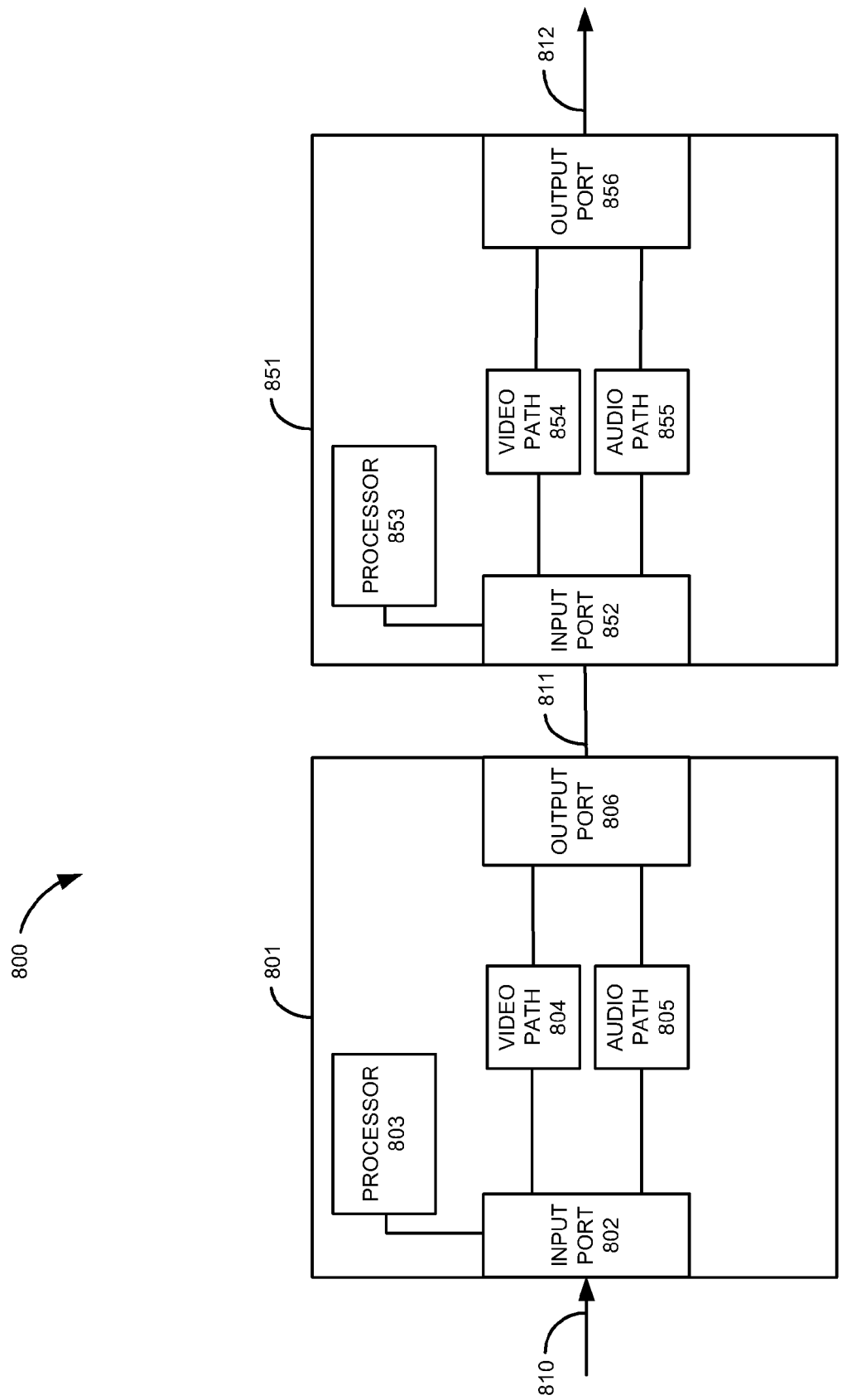
FIG. 8 is a block diagram that illustrates a communication system.

FIG. 8 is a block diagram that illustrates communication system 800. Transmitter 801 comprises input port 802, processor 803, video path 804, audio path 805, and output port 806. Input port 802 is coupled with processor 803, video path 804, and audio path 805. Audio path 805 and video path 804 are coupled with output port 806. Input port 802 may be any type of switching device, such as an analog switch, a digital switch, a multiplexer, a tri-state device, and the like. Those of skill in the art will recognize that other transmitters may have other architectures and include other devices or methods for control within the scope of the present invention.

Receiver 851 comprises input port 852, processor 853, video path 854, audio path 855, and output port 856. Input port 852 is coupled with processor 853, video path 854, and audio path 855. Audio path 855 and video path 854 are coupled with output port 856. Input port 852 may be any type of switching device, such as an analog switch, a digital switch, a multiplexer, a tri-state device, and the like. Those of skill in the art will recognize that other receivers may have other architectures and include other devices or methods for control within the scope of the present invention.

Input port 802 receives input data comprising audio data or video data from an audio or video data source (not shown) via link 810. Processor 803 determines if the expected input data from input port 802 comprises audio data or video data. The method of determining if the expected input data is audio or video may include checking the status of a control, switch, pin, or other indicator. Moreover, this method may include receiving a signal from a control port on a transmitter or receiver. Upon determining that the expected input data is audio data, processor 803 controls input port 802 to send the input data to audio path 805. Upon determining that the expected input data is video data, processor 803 controls input port 802 to send the input data to video path 804. Output port 806 receives audio output data from audio path 805 and video output data from video path 804. Output port 806 sends the audio output data or the video output data to receiver 851 via link 811.

Input port 852 receives input data comprising audio data or video data from transmitter 801 via link 811. Processor 853 determines if the expected input data from input port 852 comprises audio data or video data. The method of determining if the expected input data is audio or video may include checking the status of a control, switch, pin, or other indicator. Moreover, this method may include receiving a signal from a control port on a transmitter or receiver. Upon determining that the expected input data is audio data, processor 853 controls input port 852 to send the input data to audio path 855. Upon determining that the expected input data is video data, processor 853 controls input port 852 to send the input data to video path 854. Output port 856 receives audio output data from audio path 855 and video output data from video path 854. Output port 856 presents the audio output data or the video output data to an audio or video device (not shown) via link 812.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A transmitter comprising:
    an input port configured to receive input data comprising video data from a camera and audio data from a microphone;
    a processor coupled with the input port;
    a video path;
    an audio path; and
    an output port coupled with the video path and the audio path;
    wherein the processor is configured to determine whether the input data from the input port comprises audio data or video data based on an indicator that is configured prior to receiving the input data and is separate from the input data;
    wherein the processor is also configured to send the input data from the input port to the video path when the input data comprises video data, and to send the input data to the audio path when the input data comprises audio data;
    wherein the output port is configured to receive video output data from the video path and audio output data from the audio path; and
    wherein the output port is also configured to send the video output data or the audio output data to a receiver.

2. The transmitter of claim 1, wherein the indicator comprises a change in a status of a switch.

3. The transmitter of claim 1, wherein the indicator is received from a computer at a control port.

4. The transmitter of claim 1, wherein the indicator comprises a state of a pin on the input port.

5. The transmitter of claim 1, wherein the indicator comprises a signal from the receiver.

6. The transmitter of claim 1, further comprising a power port wherein the processor selects an amount of power supplied to the power port based on the input data.

7. The transmitter of claim 1, wherein the transmitter and the receiver communicate on a wireless link.

8. A receiver comprising:
    an input port configured to receive input data from a transmitter comprising video data from a camera and audio data from a microphone;
    a processor coupled with the input port;
    a video path;
    an audio path; and
    an output port coupled with the video path and the audio path;
    wherein the processor is configured to determine whether the input data from the input port comprises audio data or video data based on an indicator that is configured prior to receiving the input data and is separate from the input data;

wherein the processor is also configured to send the input data from the input port to the video path when the input data comprises video data, and to send the input data to the audio path when the input data comprises audio data;

wherein the output port is configured to receive video output data from the video path and audio output data from the audio path; and wherein the output port is also configured to send the video output data or the audio output data.

9. The receiver of claim 8, wherein the indicator comprises a change in a status of a switch.

10. The receiver of claim 8, wherein the indicator is received from a computer at a control port.

11. The receiver of claim 8, wherein the indicator comprises a state of a pin on the output port.

12. The receiver of claim 8, wherein the indicator comprises a signal from the transmitter.

13. The receiver of claim 8, further comprising a power port wherein the processor selects an amount of power supplied to the power port based on the input data.

14. The receiver of claim 8, wherein the transmitter and the receiver communicate on a wireless link.

15. A method for sending data comprising:

receiving input data at an input port configured to receive video data from a camera and audio data from a microphone;

receiving an indicator which arrives prior to the input data and is separate from the input data;

determining whether the data from the input port comprises audio data or video data based on the indicator;

sending the input data to a video path when the input data comprises video data;

sending the input data to an audio path when the input data comprises audio data;

sending video output data from the video path to an output port when the input data comprises video data;

sending audio output data from the audio path to the output port when the input data comprises audio data;

providing the video output data from the output port when the input data comprises video data; and providing the audio output data from the output port when the input data comprises audio data.

16. The method of claim 15, wherein the indicator comprises a change in a status of a switch.

17. The method of claim 15, wherein the indicator is received from a computer at a control port.

18. The method of claim 15, wherein the indicator comprises a state of a pin on the input port.

19. The method of claim 15, wherein the indicator comprises a signal from a transmitter.

20. The method of claim 15, wherein the indicator comprises a signal from a receiver.

21. The method of claim 15, further comprising selecting an amount of power supplied to a power port based in the input data.

22. The method of claim 15, wherein providing the output data from the output port comprises providing the output data from the output port over a wireless link.

* * * * *